(12) United States Patent
Anderton et al.

(10) Patent No.: US 7,227,484 B2
(45) Date of Patent: Jun. 5, 2007

(54) STARTUP APPARATUS AND TECHNIQUE FOR A WIRELESS SYSTEM THAT USES TIME DOMAIN ISOLATION

(75) Inventors: David O. Anderton, Austin, TX (US);
Jeffrey L. Yiin, Austin, TX (US);
Xue-Mei Gong, Austin, TX (US)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 11/172,213

(22) Filed: Jun. 29, 2005

(65) Prior Publication Data

US 2007/0001884 A1    Jan. 4, 2007

(51) Int. Cl.
*H03M 1/66* (2006.01)
(52) U.S. Cl. .................. 341/144; 375/350; 375/372; 340/539.12
(58) Field of Classification Search ............ 375/232, 375/350, 372; 340/539.12; 341/144, 172; 331/17; 358/296; 370/241.1
See application file for complete search history.

(56) References Cited

U.S. PATENT DOCUMENTS

| | | | | |
|---|---|---|---|---|
| 4,764,940 A | * | 8/1988 | Paneth et al. ............... 375/308 |
| 4,968,989 A | * | 11/1990 | Olmstead et al. ........... 341/150 |
| 5,072,219 A | * | 12/1991 | Boutaud et al. ............. 341/150 |
| 5,272,452 A | * | 12/1993 | Adachi et al. ............... 331/17 |
| 5,451,950 A | * | 9/1995 | Vincelette et al. .......... 341/150 |
| 5,557,644 A | * | 9/1996 | Kuwabara ................... 375/340 |
| 5,696,593 A | * | 12/1997 | Chiba et al. ................ 358/296 |
| 6,178,193 B1 | * | 1/2001 | Kondo ....................... 375/130 |
| 6,577,602 B1 | * | 6/2003 | Beck et al. ............... 370/241.1 |
| 6,681,272 B1 | * | 1/2004 | Anderson et al. ............. 710/52 |
| 2004/0130446 A1 | * | 7/2004 | Chen et al. |

* cited by examiner

*Primary Examiner*—Jean Bruner Jeanglaude
(74) *Attorney, Agent, or Firm*—Peter Zawilski

(57) ABSTRACT

A technique includes providing a butter to receive data from a processor of a wireless device in response to an active mode of the processor and selectively coupling an input terminal of a filter to the buffer based on a status of the buffer. The techniciue may be used with a wireless system that includes a digital signal processor, a buffer, a wireless interface and a switch. The buffer receives data from the digital signal processor in response to an active mode of the digital signal processor. The switch selectively couples a terminal of the wireless interface to the buffer in response to a determination of a status of the buffer.

30 Claims, 5 Drawing Sheets

STARTUP APPARATUS AND TECHNIQUE FOR A WIRELESS SYSTEM THAT USES TIME DOMAIN ISOLATION

BACKGROUND

The invention generally relates to a startup apparatus and technique for a wireless system that uses time domain isolation.

A typical wireless device, such as a cellular telephone, includes a radio frequency (RF) circuit, or radio, that establishes communication between the wireless device and a wireless network. The wireless device typically also includes digital circuitry for purposes of performing such functions as encoding/decoding data, compressing/de-compressing data, modulating/de-modulating data, scanning a keypad of the wireless device, etc.

SUMMARY

In an embodiment of the invention, a technique includes providing a buffer to receive data from a processor of a wireless device in response to an active mode of the processor and selectively coupling an input terminal of a filter to the buffer based on a status of the buffer.

In another embodiment of the invention, an apparatus includes a buffer, which is adapted to receive data from a processor of a wireless device during an active mode of the processor. The apparatus also includes a switch that is adapted to selectively couple an input terminal of an integrator to the buffer based on a status of the buffer.

In another embodiment of the invention, a wireless system includes a digital signal processor, a buffer, a wireless interface and a switch. The buffer is adapted to receive data during an active mode of the digital signal processor. The wireless interface has an input terminal; and the switch is adapted to selectively couple the input terminal of the wireless interface to the buffer based on a status of the buffer.

Advantages and other features of the invention will become apparent from the following drawing, description and claims.

DETAILED DESCRIPTION

Figure 1:
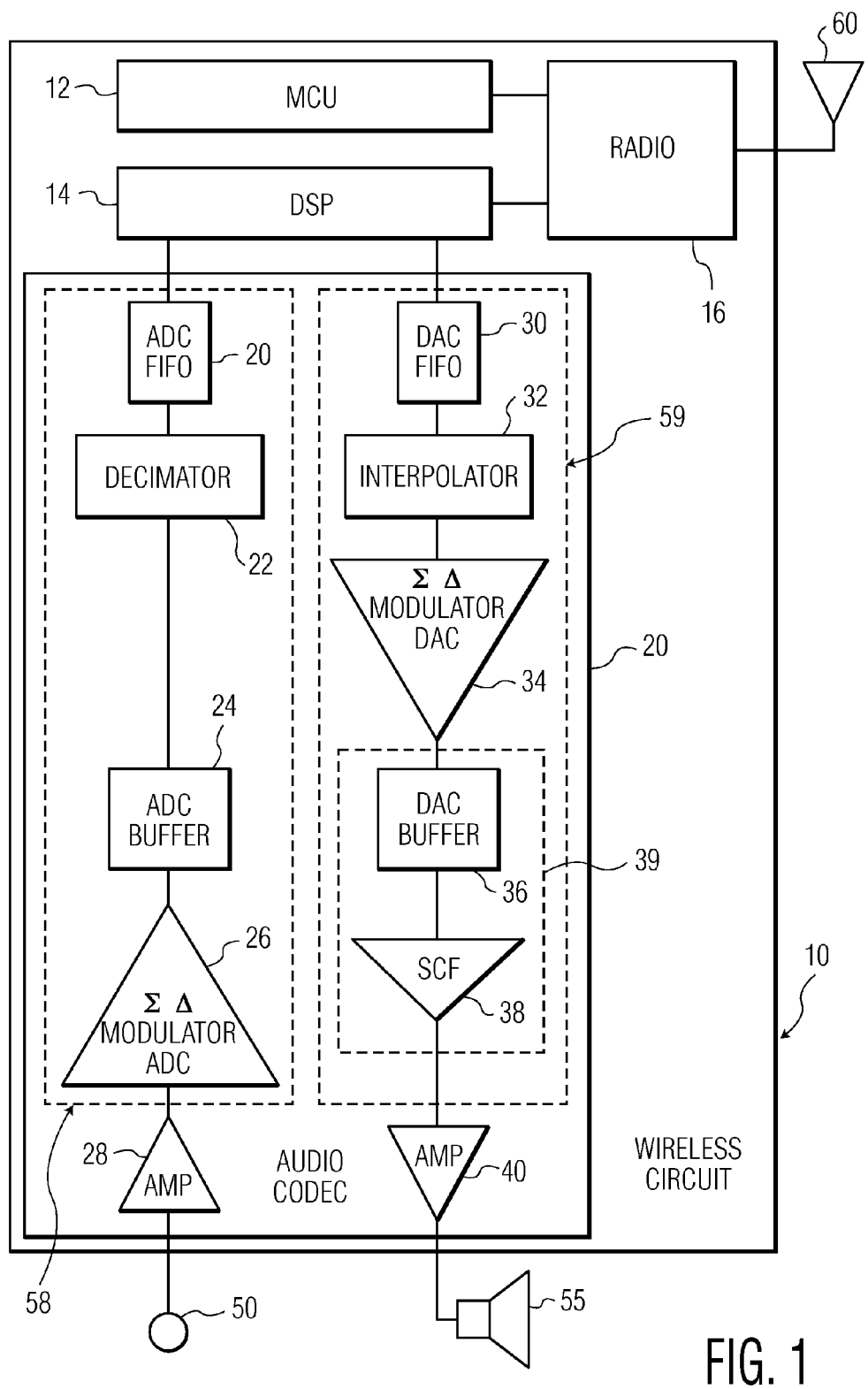
FIGS. 1 and 6 are schematic diagrams of wireless devices according to different embodiments of the invention.

Referring to FIG. 1, in accordance with an embodiment of the invention, certain signal-processing components of a wireless circuit 10 are turned off intermittingly when the circuit 10 performs radio operations. For purposes of preventing a speech data output path of the wireless circuit 10 from running out of speech data when these signal-processing components are turned off, the wireless circuit 10 includes a pattern generator (not depicted in FIG. 1) to keep the speech data output path primed with data.

The wireless circuit 10 may be constructed to digitize speech and communicate the resulting speech data to a wireless network; and the wireless circuit 10 may be constructed to receive speech data from the wireless network and produce an audio output in response thereto. Because a radio frequency (RF) circuit, or radio 16, of the wireless circuit 10 processes relatively low magnitude signals, the operation of the radio 16 may be affected by ground noise, inductive coupling, capacitive coupling, etc., which are generated by certain "noisy" digital components (a digital signal processor (DSP) 14, a keyboard scanner, etc.) of the wireless circuit 10. Thus, a technique called time domain isolation (TDI) may be used to silence certain "noisy" digital circuitry during operation of the radio 16.

Pursuant to TDI, in general, the radio 16 operates when signal-processing circuitry of the wireless circuit 10 is inactive, and vice versa. As a consequence, operation of the "noisy" digital components does not interfere with the performance of the radio 16, and vice versa. The radio 16 is generally turned on during RF time slots and turned off during signal-processing time slots. Likewise, the "noisy" digital components are turned on during the signal processing time slots and are turned off during the RF time slots.

More specifically, in accordance with some embodiments of the invention, the RF time slots generally occur whenever the radio 16 is active; and thus, the wireless circuit 10 ensures that the radio 16 is not operating concurrently with its noisy digital components, which have the potential of causing noise-related problems with operation of the radio 16. In accordance with some embodiments of the invention, the wireless circuit 10 communicates with the wireless network using a Global System for Mobile communications (GSM) standard that establishes frames and time slots within the frames for the wireless circuit 10 to receive data from and transmit data to the wireless network, although other communication standards may be used in accordance with other embodiments of the invention.

The wireless circuit 10 controls when the RF time slots and signal-processing time slots occur. In accordance with some embodiments of the invention, the RF time slots occur when the wireless circuit 10 transmits data to the base station, receives data from the base station, or monitors the power of adjacent cells in the wireless network. The RF time slots also occur when the wireless circuit 10 performs neighbor cell monitoring functions, such as searching for control channels; extracting temporal and frequency information; or decoding control information from the serving base station or a neighbor cell. It is noted that RF time slots may occur while the radio 16 is tuned to the appropriate frequency; and hence, a particular RF time slot may begin shortly before any of the above-described operations and end when the operation is complete. Thus, it is possible that the RF and signal-processing time slots may overlap, in some embodiments of the invention.

More specific details regarding the potential RF and signal-processing time slot overlap as well as the operation of the wireless circuit 10 with TDI, in accordance with some embodiments of the invention, may be found in U.S. patent application Ser. No. 10/426,042 entitled, "HIGHLY INTEGRATED RADIO-FREQUENCY APPARATUS AND ASSOCIATED METHODS," which was filed on Apr. 29, 2003, and is hereby incorporated by reference.

As depicted in FIG. 1, the wireless circuit 10 may, in addition to the radio 16 and DSP 14, include an audio codec 20 that includes a speech data input path, or ADC path 58, and a speech data output path, or DAC path 59. The ADC path 58 digitizes an analog audio signal that is provided by a microphone 50 and provides the resultant digitized speech data to the DSP 14. The DAC path 59 receives digitized speech data from the DSP 14 and provides a corresponding analog audio signal to drive a speaker 55.

As a more specific example, the microphone 50 may be coupled to an amplifier 28 (of the codec 20) that provides an amplified analog signal to a delta sigma modulator and analog-to-digital converter (herein called a "modulator 26") of the ADC path 58. The resultant digital signal from the modulator 26 is furnished to an ADC buffer 24 of the ADC path 58. A decimator 22 of the ADC path 58 receives data from the ADC buffer 24 and furnishes the data to an ADC first-in first-out buffer (FIFO) 20 (of the ADC path 58), which buffers the data for the DSP 14.

In accordance with some embodiments of the invention, the DAC path 59 includes a DAC FIFO 30 that receives digitized speech data from the DSP 14 and an interpolator 32 that receives data from the DAC FIFO 30. A delta sigma modulator and digital-to-analog converter (herein called a "modulator 34") of the DAC path 59 receives the data stream from the interpolator 32 and furnishes the data to a DAC buffer 36 of the DAC path 59. As further described below, when data is available in the DAC buffer 36, a switched capacitor filter (SCF) 38 of the DAC path 59 receives the data from the DAC buffer 36 and provides a corresponding analog signal to an amplifier 40 that drives the speaker 55.

It is noted that the architecture that is depicted in FIG. 1 is merely an example of one out of many possible architectures for the wireless circuit. Furthermore, the wireless circuit in accordance with other embodiments of the invention may have a similar architecture to the one depicted in FIG. 1 but may have different components. For example, in other embodiments of the invention, the wireless device may include a modulator other than a delta-sigma modulator, which replaces the modulator 34 and/or a filter other than a switched capacitor filter, which replaces the SCF 38. Thus, many other embodiments of the invention are possible and are within the scope of the appended claims.

The DSP 14 is a "noisy" digital component of the wireless circuit 10, which is shut down by the circuit 10 during the RF time slots. One challenge that is associated with turning off the DSP 14 during the RF time slots is maintaining continuity in the functions that are performed by the DSP 14. For instance, a voiceband audio stream requires processing one data sample every 125 microseconds (μs). In one embodiment, the duration of an RF time slot may exceed five milliseconds (ms), the RF time slot, or the equivalent of forty audio data samples. Since the DSP 14 is inactive during this interval, circuitry is provided to buffer the acoustic data in both the input (via the ADC path 58) and output (via the DAC path 59) directions.

In accordance with some embodiments of the invention, the DAC path 59 may include a significant amount of storage to bridge the RF time slots when the DSP 14 is inactive. For example, in some embodiments of the invention, the DAC buffer 36 may have a sufficient capacity to store 5.7 ms of audio data. The DAC buffer 36 is not turned off during the RF time slots and continues to operate whenever the audio path is active. Furthermore, additional buffering (8 ms in one embodiment) may be provided by the FIFO 30. The DAC FIFO 30 may be implemented in circuitry that is shut down during the RF time slots. When a telephone call is initiated, there may be a relatively long delay before any valid speech data is received from the phone call. For example, it may take approximately 37 ms to receive a valid speech block and another 10 to 12 ms to decode the speech block. Furthermore, there may be a period of fast associated control channel (FACCH) burst transactions at the beginning of a call that further delays receipt of valid audio data.

Certain circuitry (described below) of the DAC path 59 continues to function between the time the codec 20 is fully enabled (at the conclusion of an RF time slot) and the time that valid speech data is provided by the DSP 14. In general, if the DAC buffer 36 runs out of speech data, the DSP 14 is interrupted at a certain rate (a rate of 8 kilohertz (kHz), for example) to take corrective action (writing "dummy data," for example, if no speech data is currently available) to the DAC path 59 to keep the path 59 primed with data. However, due to the above-described blackout periods that occur in connection with TDI, the DSP 14 is not always available to maintain the integrity of the data that is processed by the DAC path 59.

In accordance with embodiments of the invention that are described herein, the codec 20 includes a "quiet" data source (further described below) that is separate from the DSP 14 and is available during the RF time slots to keep the DAC path 59 primed with data.

In accordance with some embodiments of the invention, the wireless circuit 10 may be a single semiconductor integrated circuit package. However, in other embodiments of the invention, the wireless circuit 10 may be formed from multiple semiconductor packages. Furthermore, in accordance with some embodiments of the invention, the wireless circuit 10 may be formed on a single die of a single semiconductor package, although in other embodiments of the invention, the wireless circuit 10 may be formed on multiple dies of a single semiconductor package. Thus, many variations are possible and are within the scope of the appended claims.

Figure 2:
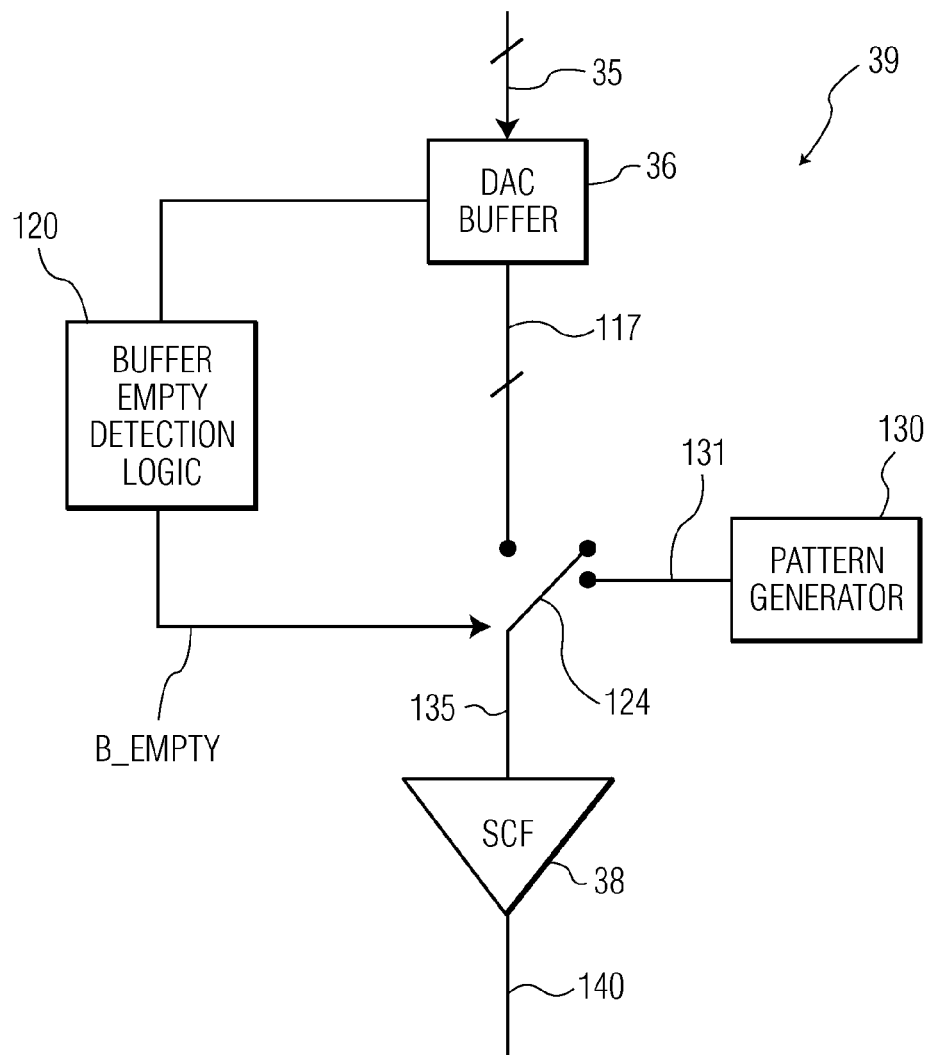
FIG. 2 is a schematic diagram of an acoustic transmit path of the wireless device of FIG. 1 according to an embodiment of the invention.

FIG. 2 depicts a selected section 39 (see FIG. 1) of the DAC path 59 in accordance with some embodiments of the invention. Referring to FIG. 2 in conjunction with FIG. 1, in accordance with some embodiments of the invention, the DAC buffer 36 has multibit input terminals 35 to receive speech data from the modulator 34 (see FIG. 1). The modulator 34 modulates its multibit oversampled input signal to provide a one bit oversampled digital output signal, in accordance with some embodiments of the invention. For example, the modulator 34 may sample a 13 bit data input stream to produce a corresponding oversampled one bit sign of change signal at its output terminal.

In accordance with some embodiments of the invention, the one bit sign of change signal that is produced by the modulator 34 has either a "+1" or a "−1" state: the "+1" state indicates a signal increase; and conversely, the "−1" notation indicates a signal decrease. The stream of +1 and −1 bits that are produced by the modulator 34 are stored in the DAC buffer 36.

When data is present in the DAC buffer 36, (i.e., when the DAC buffer 36 is not empty), the data in the DAC buffer 36 is communicated over an output terminal 117 of the DAC buffer 36 to an input terminal 135 of the SCF 38. The SCF 38, in accordance with some embodiments of the invention, integrates the sign of change signal that is received from the DAC buffer 36. Thus, if the SCF 38 receives a stream of a successive +1 bits, the output signal of the SCF 38 increases; and conversely, if the SCF 38 receives successive −1 bits, then the output signal decreases.

The SCF 38 also functions as a digital-to-analog converter (DAC), and thus, produces an analog signal at an output terminal 140 of the SCF 38. The SCF 38 may also band limit the frequency of the analog signal that appears at the output terminal 140.

In accordance with some embodiments of the invention, the SCF 38 operates in both the signal-processing and RF time slots. Because the DSP 14 does not provide data to the DAC path 59 during the RF time slots and the DSP 14 experiences related blackout periods, the DAC buffer 36 may become empty; and thus, if not for features of the wireless circuit 10, which are described below, the SCF 38 may not have an input signal. It is noted that during a speech call, the DAC buffer 36 does not run out of data, in accordance with some embodiments of the invention. However, in accordance with some embodiments of the invention, it is the scenario addressed by the technique and system disclosed herein that occurs in connection with the DSP 14 being turned off during an RF time slot and starting back up when a new speech call has been initiated. It is noted that if the DAC buffer 36 provides a constant input signal to the SCF 38 when the DAC buffer 36 is empty, the signal path of the SCF 38 may become saturated due to the integration of a constant value bit stream.

Naturally-occurring signals are not exactly constant, but rather, a naturally-occurring "constant" signal may deviate slightly over a small range of values to cause the modulator 114 to furnish a stream of −1 and +1 bits having a zero mean (i.e., the average value of the bit stream is zero) to be provided to the SCF 38. It is the non-naturally-occurring constant signal (such as a signal produced by a block of ones or zeros from the DAC buffer 36), however, that may saturate the SCF 38.

Therefore, in accordance with the embodiments of the invention, the DAC path 59 includes circuitry to ensure that the SCF 38 is not fed a constant value input stream that might otherwise occur in connection with TDI, which would saturate the SCF 38. More specifically, the input terminal 135 of the SCF 38 is coupled to a switch 124 (a metal-oxide-semiconductor (MOS)-based switch or a complimentary MOS (CMOS)-based transmission gate, as just a few examples) that is operated by the DAC path 59 to selectively couple the input terminal 135 to an output terminal 131 of a pattern generator 130, a quiet data source, in response to the DAC buffer 36 becoming empty. Thus, when connected to the SCF 38, the pattern generator 130 provides a varying stream of data to the SCF 38 (in lieu of the DAC buffer 36) to ensure that the SCF 38 does not become saturated either during or slightly after a particular time interval during an RF time slot.

More specifically, in accordance with some embodiments of the invention, the DAC buffer 36 is coupled to buffer empty detection logic 120 that monitors the state of the DAC buffer 36 to determine when buffer 36 is empty. In response to the logic 120 detecting that the DAC buffer 36 is empty, in accordance with some embodiments of the invention, the logic 120 asserts a control signal (called "B_EMPTY" in FIG. 2) to cause the switch 124 to couple the input terminals 135 of the SCF 38 to the output terminals 131 of the pattern generator 130 to maintain a data flow to the SCF 38. Otherwise, if the DAC buffer 36 is not empty, the logic 120 de-asserts the B_EMPTY signal to cause the switch 124 to couple the input terminals 135 of the SCF 38 to the output terminals 117 of the DAC buffer 36.

Figure 3:
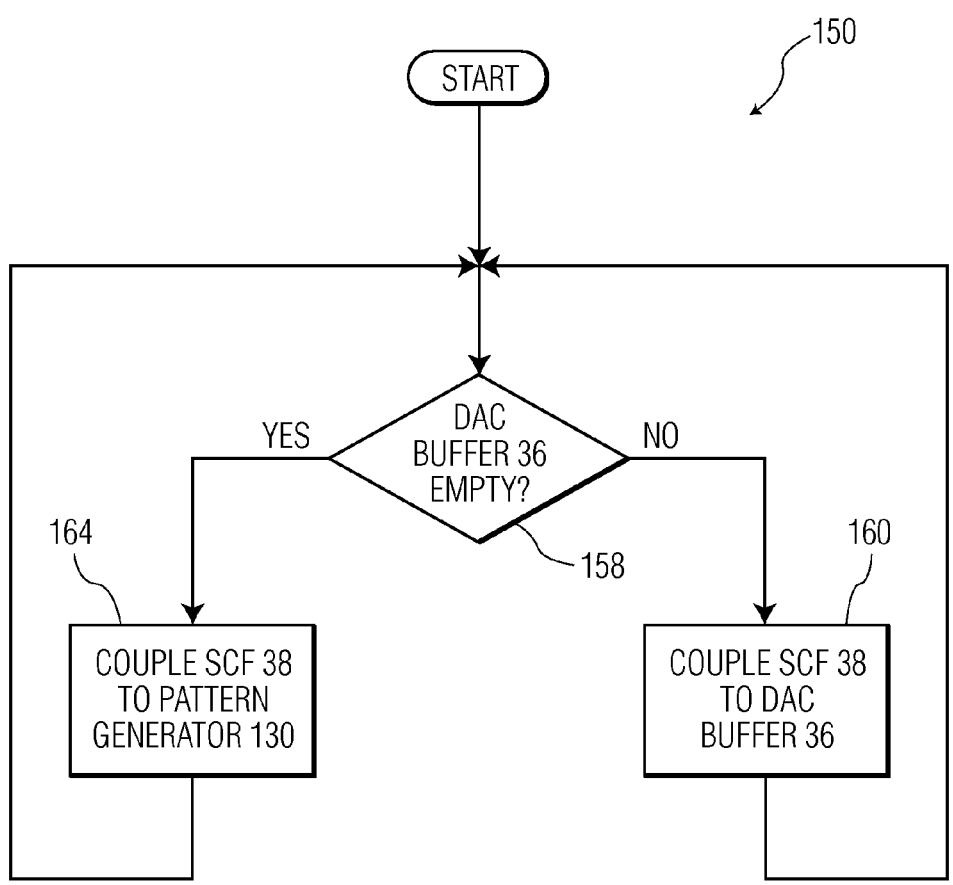
FIG. 3 is a flow diagram depicting a technique to control an input data stream to a switched capacitor filter of the wireless device to accommodate DSP blackout periods according to an embodiment of the invention.

Thus, referring to FIG. 3, in accordance with some embodiments of the invention, the logic 120 performs a technique 150 to regulate the input data stream that is provided to the SCF 38. Pursuant to the technique 150, the logic 120 determines (diamond 158) whether the DAC buffer 36 has a predetermined state, such as an empty state. If so, then pursuant to the technique 150, the logic 120 couples (block 164) the SCF 38 to the pattern generator 130. Otherwise, if the DAC buffer 36 does not have the predetermined state (the DAC buffer 36 is not empty, for example), then the logic 120 couples (block 160) the SCF 38 to the DAC buffer 36.

Figure 4:
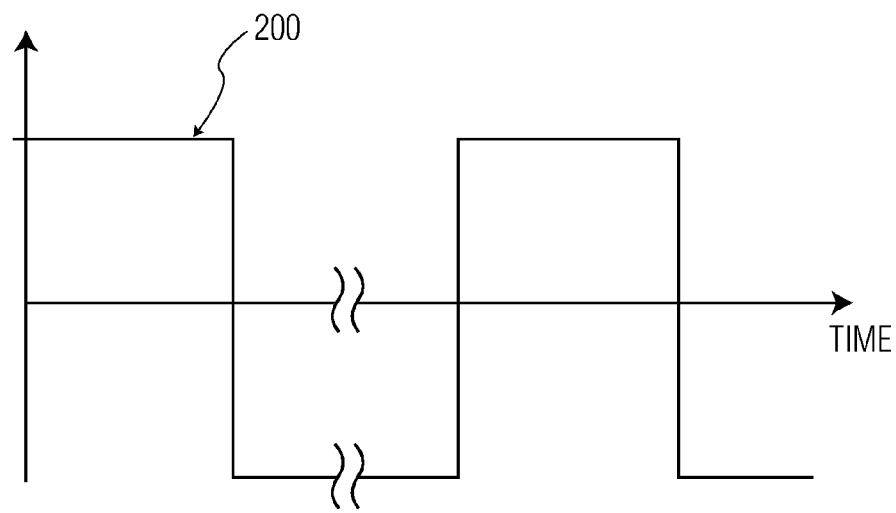
FIGS. 4 and 5 depict exemplary waveforms generated by a pattern generator of the wireless device according to an embodiment of the invention.

The pattern generator 130 may (when coupled to the SCF 38) provide a variety of different data streams to the SCF 38, depending on the particular embodiment of the invention. For example, in some embodiments of the invention, the pattern generator 130 may produce a random stream of high and low digital values to the SCF 38, and in other embodiments of the invention, the pattern generator 130 may provide a non-random data stream to the SCF 38 and in other embodiments of the invention, the pattern generator 130 may produce a pseudo random signal, as further described below. As a more specific example, FIG. 4 depicts a non-random bit waveform that is provided by the pattern generator 130 to the input terminal 135 in accordance with some embodiments of the invention. As shown, the waveform fluctuates pursuant to a waveform 200 that is essentially a square waveform of high logical states and low logical states. Thus, the mean of the waveform 200 is zero, in some embodiments of the invention.

Figure 5:
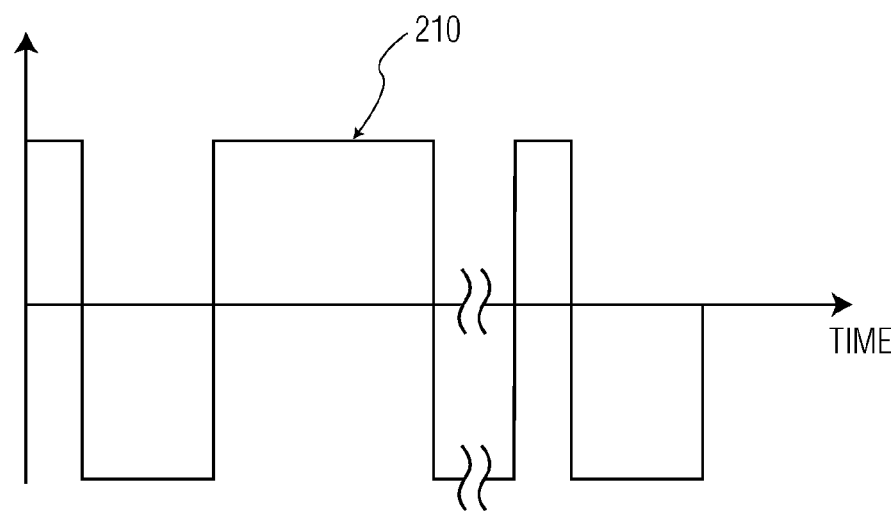

FIG. 5 depicts another waveform 210 that may be produced by the pattern generator 130 and provided to all of the input terminals 135 in accordance with other embodiments of the invention. The waveform 210 may be a pseudo random waveform that repeats at a certain frequency (a frequency of 20 Hertz (Hz), for example). Therefore, in some embodiments of the invention, the pattern generator 130 may be a pseudo random generator that has a tapped output terminal that is coupled to the input terminal 135 via the switch 124. In some embodiments of the invention, the pseudo random number generator is formed from (as an example) a linear feedback shift register that produces an output signal that has a zero mean (i.e., the output signal is made unbiased). More specifically, the shift register may have an output terminal that is coupled to an inverter that is bypassed on every other cycle for purposes of making the output stream from the linear feedback shift register unbiased.

In other embodiments of the invention, the linear feedback shift register may be significantly long (in bit stages) so that the bias does not cause saturation of the SCF 38. More specifically, in some embodiments of the invention, the pattern generator 130 may be a pseudo random generator that is formed from a linear feedback shift register that has a slight bias (i.e., the output signal has an average value close to but equal to zero). In other words, due to this bias, the output signal of the SCF 38 may ramp upwardly or downwardly during the time that the DAC buffer 36 is empty. However, the rate at which the output signal of the SCF 38 changes is small enough so that the SCF 38 does not become saturated between the time when the DAC buffer 36 becomes empty and the time in which the DAC buffer 36 once again has data. Thus, many variations are possible and are within the scope of the appended claims.

Figure 6:
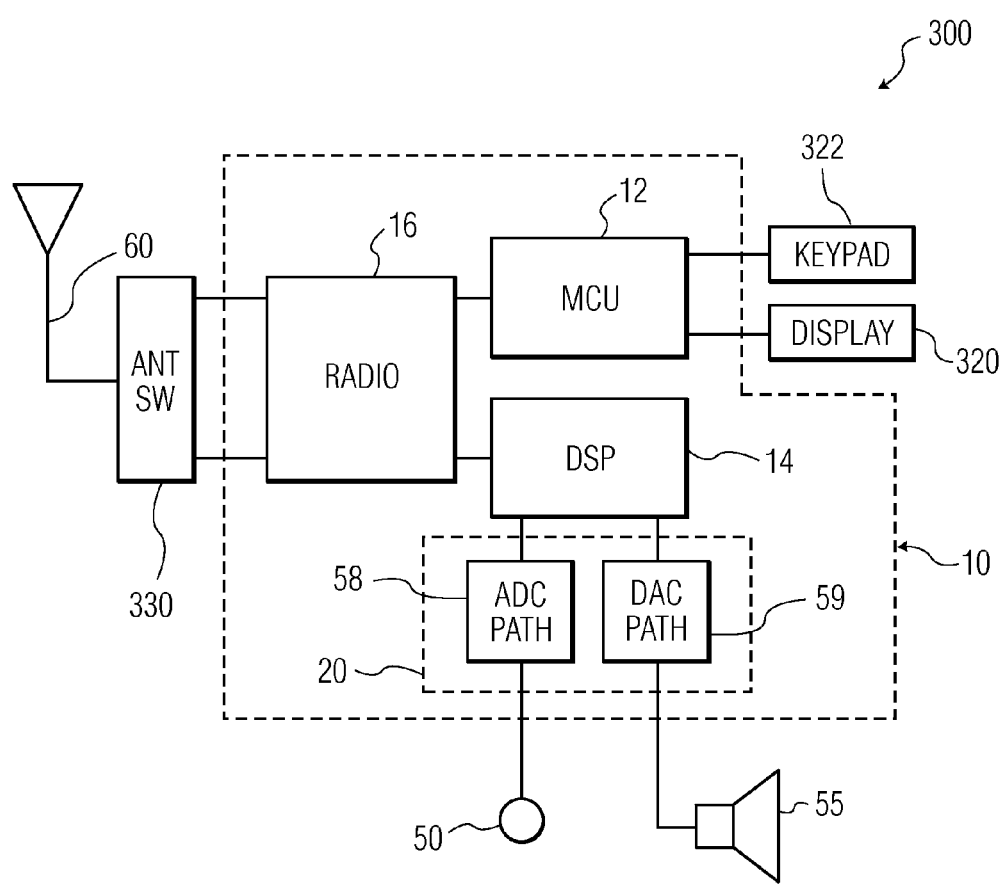

Referring to FIG. 1 in conjunction with FIG. 6, in accordance with some embodiments of the invention, the wireless circuit 10 (FIG. 1) may be part of a wireless system 300, which in addition to processing speech, provides non-speech related user services. The wireless system 300 may be part of, as examples, a cellular telephone, a personal digital assistant (PDA), a laptop computer, etc., depending on the particular embodiment of the invention. As depicted in FIG. 6, the wireless circuit 10 may be electrically coupled to the antenna 60 through an antenna switch 330, may receive an input analog audio signal from the microphone 50 and may furnish an analog audio signal to drive the speaker 50.

The wireless circuit 10 may include a microcontroller unit (MCU) 12 that may, for example, execute one or more application programs such as email or calendar application programs, for the wireless system 300. The application subsystem 310 may receive input from a keypad 312, as well as furnish display data to a display 320 of the wireless system 300.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   providing a buffer to receive data from a processor of a wireless device in response to an active mode of the processor; and
   selectively coupling an input terminal of a filter to the buffer based on a status of the buffer.

2. The method of claim 1, wherein the selectively coupling comprises isolating the input terminal of the filter from the buffer in response to the status of the buffer.

3. The method of claim 1, wherein the filter performs digital-to-analog conversion.

4. The method of claim 1, wherein the processor comprises a digital signal processor.

5. The method of claim 1, further comprising:
   using the digital-to-analog converter to produce an analog baseband signal received by a radio frequency receiver.

6. An apparatus comprising:
   a buffer to receive data from a processor of a wireless device in response to an active mode of the processor; and
   a switch to selectively couple an input terminal of an integrator to the buffer based on a status of the buffer.

7. The apparatus of claim 6, wherein the switch isolates the input terminal of digital-to-analog converter from the buffer in response to the status of the buffer.

8. The apparatus of claim 6, wherein the switch couples the input terminal of the integrator to a data source other than the buffer in response to the status of the buffer.

9. The apparatus of claim 6, further comprising a switch capacitor filter that comprises a digital-to-analog converter.

10. The apparatus of claim 6, wherein the processor comprises a digital signal processor.

11. A wireless system comprising:
    a digital signal processor;
    a buffer to receive data from the digital signal processor in response to an active mode of the digital signal processor;
    a wireless interface having a terminal; and
    a switch to selectively couple the terminal of the wireless interface to the buffer in response to a determination of a status of the buffer.

12. The wireless system of claim 11, wherein the wireless system comprises:
    a radio frequency receiver.

13. The wireless system of claim 11, further comprising:
    a modulator to modulate data provided by the processor and provide the modulated data to the buffer.

14. The wireless system of claim 13, wherein the modulator comprises a delta sigma modulator.

15. The wireless system of claim 11, wherein the switch isolates the input terminal of wireless interface from the buffer in response to the status of the buffer.

16. The wireless system of claim 11, wherein the circuit couples the input terminal of the wireless interface to a data source other than the buffer in response to the status of the buffer.

17. The wireless system of claim 11, further comprising:
    a pattern generator coupled to the input terminal of the wireless interface by the circuit in response to the status of the buffer.

18. The wireless system of claim 17, wherein the pattern generator is adapted to generate a bit stream having a zero mean.

19. The wireless system of claim 11, wherein the wireless interface comprises a switched capacitor filter.

20. A method comprising:
    providing a buffer to receive data from a processor of a wireless device in response to an active mode of the processor;
    selectively coupling an input terminal of a filter to the buffer based on a status of the buffer; and
    coupling the input terminal of the filter to a pattern generator in response to the status of the buffer.

21. The method of claim 20, wherein the selectively coupling comprises isolating the input terminal of the filter from the buffer in response to the status of the buffer.

22. The method of claim 20, wherein the selectively coupling comprises coupling the input terminal of a switched capacitor filter to a data source other than the buffer in response to the status of the buffer.

23. The method of claim 20, further comprising:
    generating a zero mean pattern using the pattern generator.

24. The method of claim 20, wherein the filter performs digital-to-analog conversion.

25. An apparatus comprising:
    a buffer to receive data from a processor of a wireless device in response to an active mode of the processor;
    a switch to selectively couple an input terminal of an integrator to the buffer based on a status of the buffer; and
    a pattern generator coupled to the input terminal of the integrator by the circuit in response to the status of the buffer.

26. The apparatus of claim 25, wherein the switch isolates the input terminal of digital-to-analog converter from the buffer in response to the status of the buffer.

27. The apparatus of claim 25, wherein the switch couples the input terminal of the integrator to a data source other than the buffer in response to the status of the buffer.

28. The apparatus of claim 25, wherein the pattern generator is adapted to generate a zero mean data pattern.

29. The apparatus of claim 25, further comprising a switch capacitor filter that comprises a digital-to-analog converter.

30. A method comprising:
    providing a buffer to receive data from a processor of a wireless device in response to an active mode of the processor; and
    selectively coupling an input terminal of a filter to the buffer based on a status of the buffer, comprising coupling the input terminal of a switched capacitor filter to a data source other than the buffer in response to the status of the buffer.

* * * * *